Figure 1:
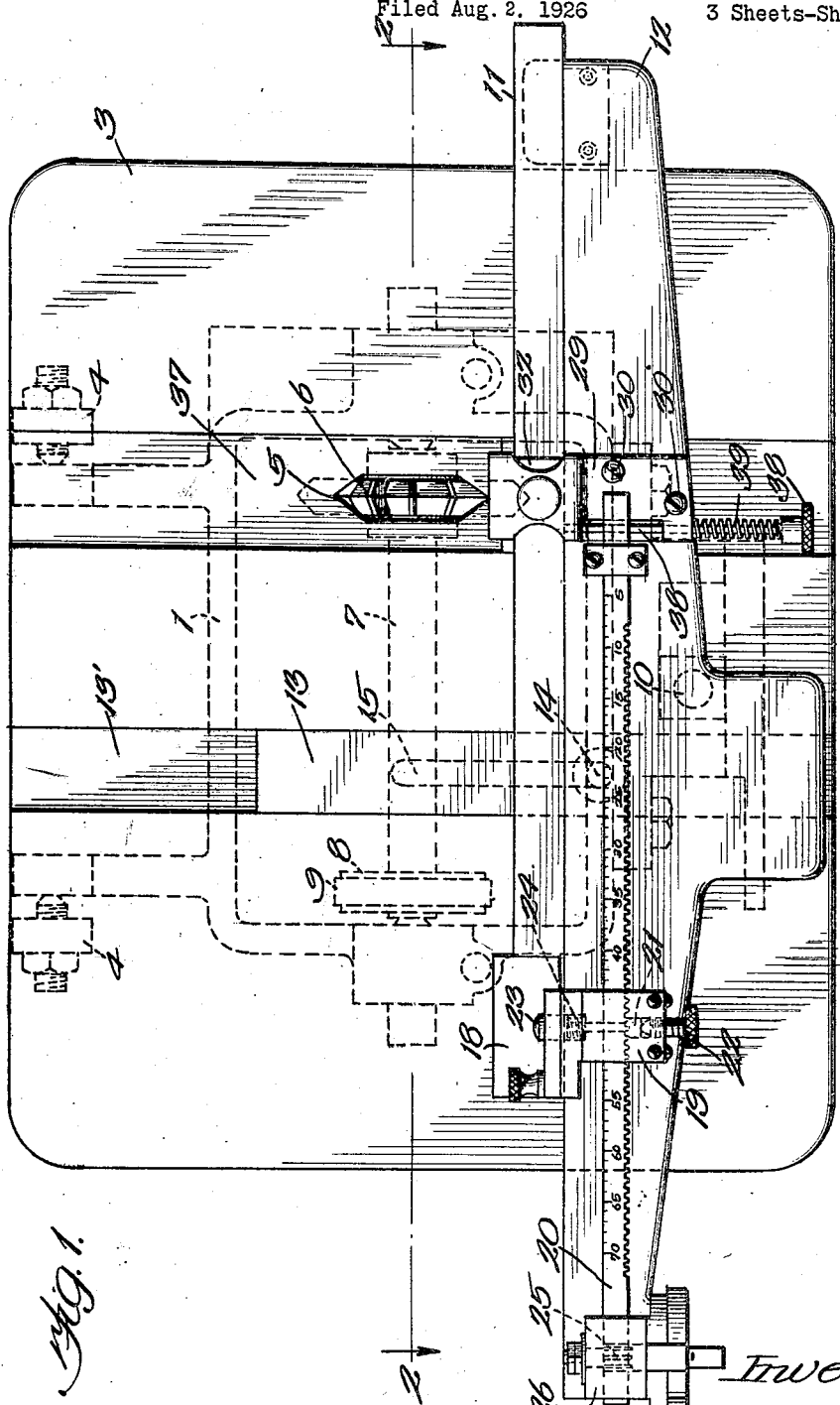

July 10, 1928.

W. J. KNOLL 1,676,336

BEVELING MACHINE

Filed Aug. 2, 1926

3 Sheets-Sheet 1

Inventor:
William J. Knoll
By ............ atty.

July 10, 1928.
W. J. KNOLL
BEVELING MACHINE
Filed Aug. 2, 1926     3 Sheets-Sheet 2
1,676,336
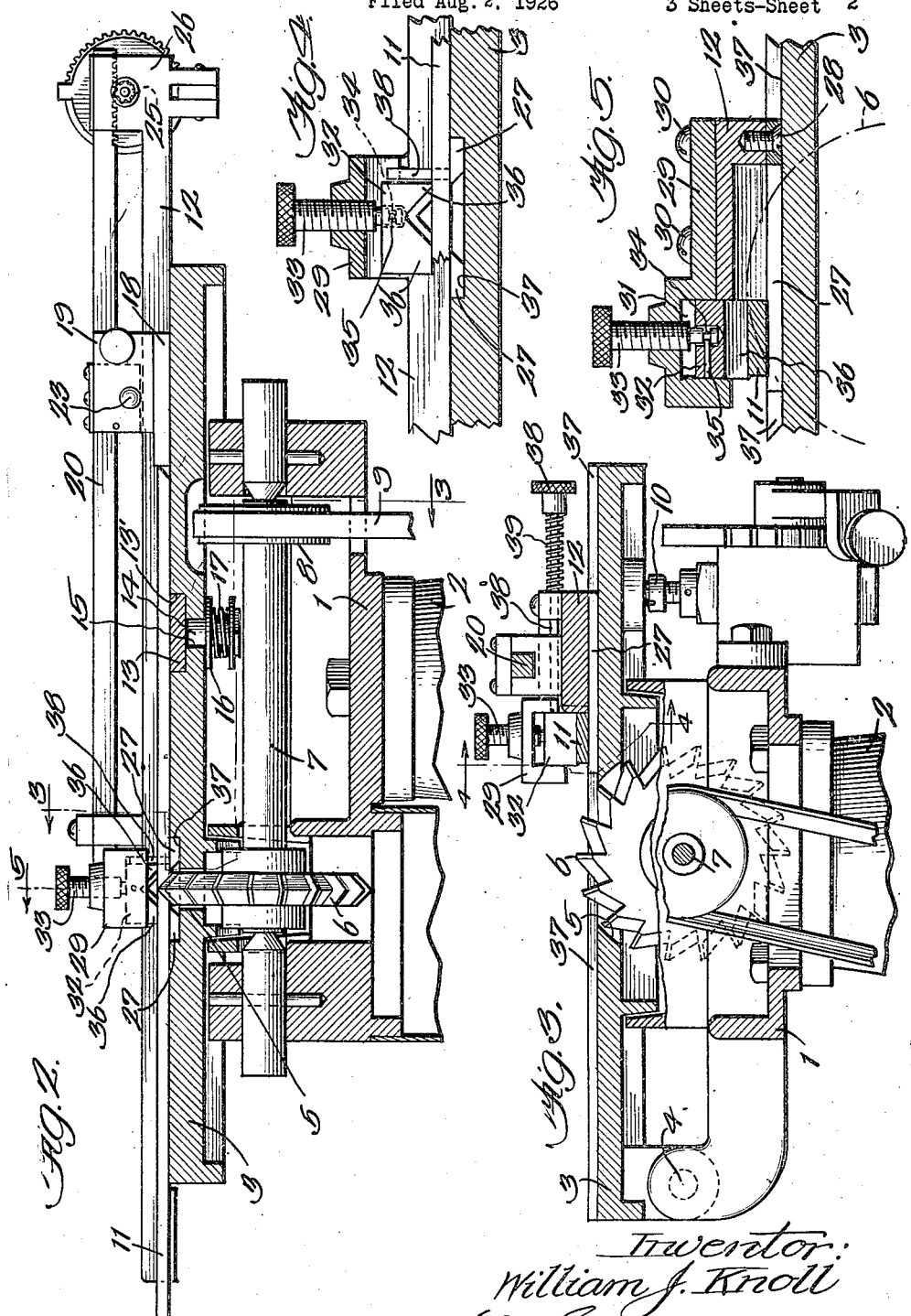
Inventor:
William J. Knoll
By G. L. Cragg Atty.

July 10, 1928.
W. J. KNOLL
BEVELING MACHINE
Filed Aug. 2, 1926
1,676,336
3 Sheets-Sheet 3
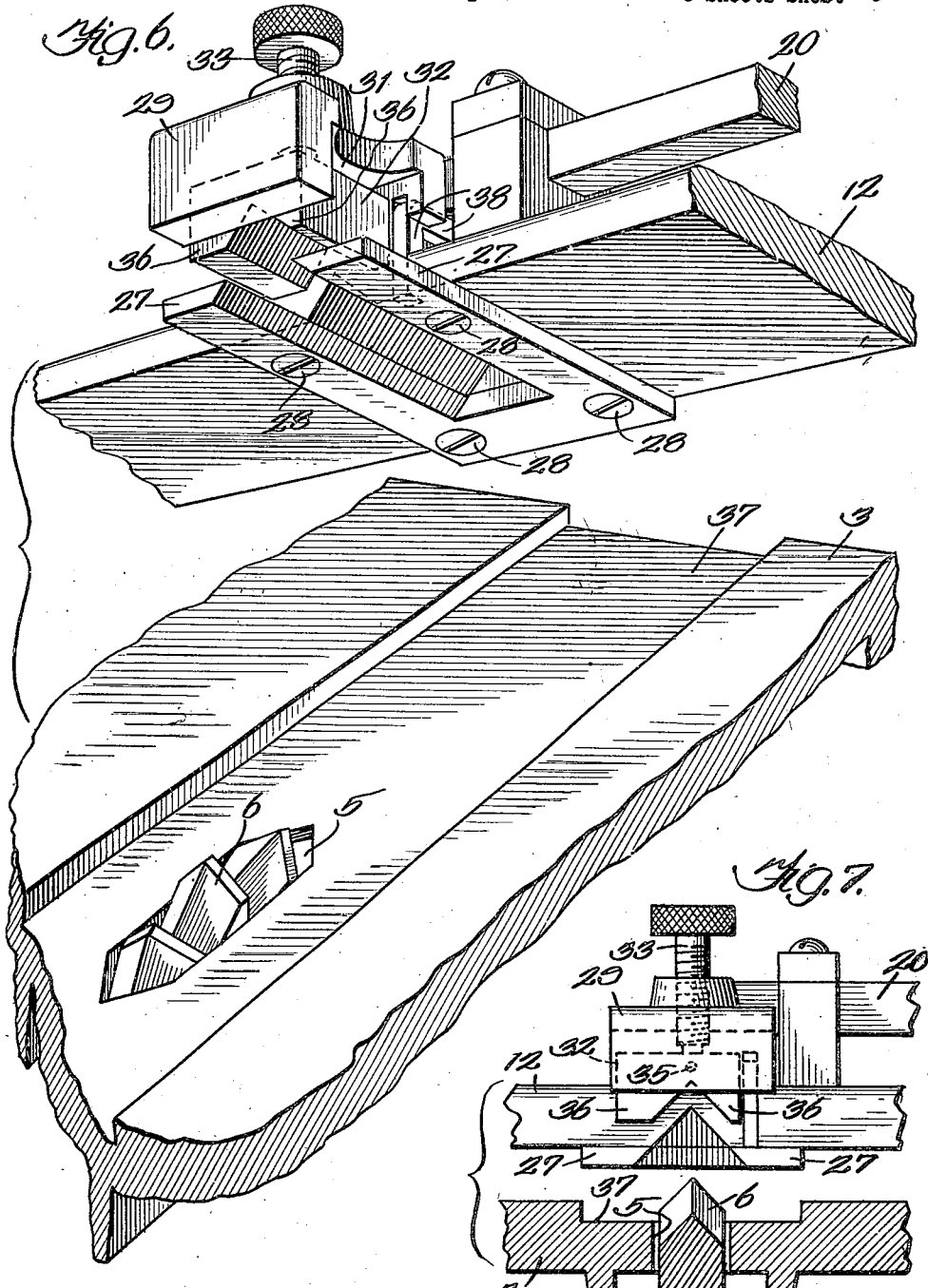

Patented July 10, 1928.

1,676,336

UNITED STATES PATENT OFFICE.

WILLIAM J. KNOLL, OF CHICAGO, ILLINOIS, ASSIGNOR TO H. B. ROUSE & COMPANY, OF CHICAGO, ILLINOIS, A CORPORATION OF ILLINOIS.

BEVELING MACHINE.

Application filed August 2, 1926. Serial No. 126,561.

My invention relates to beveling machines and is of particular service in connection with a machine shown in my United States Patent 1,573,554 dated February 16, 1926.

The machine disclosed in the aforesaid patent includes a work table, a carriage in tongue and groove connection with the work table, a cutting wheel having symmetrically related beveling faces sloping from the crown thereof, this cutting wheel projecting upwardly through the top surface of the work table to the desired extent, gaging means upon the carriage for adjusting the length of strip material that is to be cut, and a clamping device carried by the carriage and serving to press the strip material upon the table to hold the strip material in accurate relation to the cutter as the carriage is moved on the table to bring the work against the cutting wheel.

This construction necessitates careful manipulation of the carriage in order that the pressure of the work upon the table, as this work is moved by the carriage, may not cause faulty operation. The pressure exerted upon the work to hold it in relation to the gauge must not be too heavy with the result that the work has to be carefully manipulated in order that it may maintain its accurate relation with the gaging device upon the carriage. I relieve the table of any undue pressure of the work thereon by providing a suitably formed clamp upon the carriage which serves to hold the work with relation to the gage upon the carriage independently of the work table, this clamp serving to position the work upon the top surface of the work table where the cutting wheel projects upwardly therethrough so that the locations of the mitering cuts are definitely fixed in the work being cut.

I will explain my invention more fully by reference to the accompanying drawings in which Fig. 1 is a plan view of a beveling machine constructed in accordance with the preferred embodiment of my invention; Fig. 2 is a sectional view on line 2—2 of Fig. 1; Fig. 3 is a sectional view on line 3—3 of Fig. 2; Fig. 4 is a detailed sectional view looking endwise at the clamp; Fig. 5 is a sectional view on line 5—5 of Fig. 2; Fig. 6 is a perspective view illustrating a portion of the work table with the cutting wheel and a portion of the carriage with the clamp in separated relation; and Fig. 7 is a detailed sectional view looking endwise at the clamp and showing the table and carriage in separated relation.

The bed 1 is suitably supported, as upon a standard 2. The work table 3 is pivoted along its rear edge to the bed as indicated at 4. The work table is formed with a transverse opening 5 therethrough through which the cutting wheel 6 is projected to an extent corresponding to the depth of the cut to be made. This cutting wheel is fixed upon a shaft 7. A pulley 8 is fixed upon the shaft and is driven by a belt 9. The extent to which the cutting wheel 6 projects above the table 3 is determined by means of a vertically adjustable post 10 which engages the bottom of the table 3 on the side thereof opposite its hinge 4. The object to be cut is illustrated in the form of a printer's rule 11, although the invention is not to be limited to any particular work to be performed. This rule is placed against the carriage 12 having a horizontal rib 13 which is received within a transverse groove 13' formed in the table, whereby the carriage is guided in its travel. The range of travel of the carriage is determined by pin 14 which passes downwardly through a transverse slot 15 in the table, the ends of the slot defining the limits of the travel of the carriage. The pin may be surrounded by a washer 16 engaging the undersurface of the table. A spring 17 presses the washer against the table to hold the carriage in assembly with the table.

The lengths into which the printer's rule 11 or other work may be cut is adjustably determined by means of the adjustable gauge stop 18 which is located in front of the work engaging upright face of the carriage 12. The gauge stop 18 is carried upon a cross head 19 which is slidably supported upon a rack bar 20, this rack bar being normally stationary upon the carriage 12. The cross head 19 receives a toothed block 21 adapted to mesh with the teeth of the rack 20. A set screw 22 holds the toothed block in its selected relation to the rack bar, this screw being threaded within the cross head. The lengths, over all, into which the rules or other work are cut, is defined by the distance between the gauge stop 18 and the cutting crown of the wheel 5 which forms miter or beveling cuts in the work. After each length of rule is cut and removed, the rule stock is fed until its end engages the stop 18 whereupon the cutting operation is repeated. If it is desired to change the lengths, over all, of the rules cut from the rule stock, the toothed block 21 must be shifted along the rack bar 20 to the required extent. To this end, the set screw 22 is withdrawn from the block whereafter the horizontal push button 23, which is connected with the block 21 and is slidable in the cross head, is pushed inwardly against the force of the restoring spring 24 to clear the toothed block from the rack, whereupon the cross head 19 is moved along the rack to the desired extent whereafter the push button is released to permit the spring 24 to bring the toothed block into engagement with the fresh rack teeth, to hold the cross head and the gauge stop thereon in new adjustment. After such adjustment has been effected it is again maintained by again tightening the set screw 22 against the toothed block 21. The rack bar 20 may bear scale marks thereon, as indictaed in Fig. 1, to aid in determining the lengths of the rules or other parts which are to be cut. When printers' rules are to be cut by the machines, the scale divisions upon the rack bar are in picas. In beveling the ends of rules or other strips, the wheel 6 has its crown in the median plane of the wheel, the wheel being symmetrically beveled upon each side of its crown, and the adjustment is such that this crown penetrates to and through the top surface of the rule's top, the result being that the strip is cut in two severed beveled ends on either side of the cutting wheel. After a rule length has been cut, the carriage is withdrawn from the cutter, the cut length of the rules removed and the strip is again advanced against the carriage stop 18, whereupon the cutting operation is repeated. If a strip of another thickness is to be cut, the table is elevated or lowered until the crown of the cutter just penetrates the strip. The length of the strip is defined by the distance between the extreme or overhanging edges of the bevel. If the lengths of the strips are to be measured between the inner or overhung edges of the bevels, the gauge 18 is set, with reference to the rack bar 20, at a position corresponding to the designated length of the strips to be cut, the error in this positioning of the gauge stop 18 being corrected by shifting the rack bar 20 a distance which is twice the distance of the base of bevel angle, the rack bar being mounted to slide in the cross head 19. Inasmuch as this adjustment of the rack must be in accordance with the thickness of the strip, the table is adjusted by the elevation or depression of the post 10. The rack adjusting device is preferably inclusive of a pinion 25 which is journaled to rotate in an enlargement 26 of the carriage 12 and which is operable by suitable mechanism such as that set forth in my aforesaid patent.

From the foregoing it will be apparent that a most accurate relationship must be maintained between the gauge stop 18 and the beveled cutting wheel 6. In order to prevent this relationship from being disturbed by any appreciable pressure of the work 11 upon the work table and in order to eliminate pressure which would interfere with the smooth movement of the carriage, I provide a work clamp totally upon the carriage and which assembles the work and carriage as a unit independently of the table after the work has been accurately positioned upon the table against said gauge stop. This clamp is positioned to straddle the beveled cutting wheel as the carriage is moved to move the work over the wheel whereby both bevels cut in the work by the wheel in one operation are accurately formed and positioned. The clamp illustrated includes two closely approached fixed jaws 27 secured to and extending transversely from the carriage 12. These jaws are desirably secured to the bottom of the carriage by screws 28. These jaws are on opposite sides of and equidistant from the vertical plane that contains the crown of the cutting wheel, this plane being perpendicular to the work positioning face of the carriage and parallel with the direction of travel of the carriage. A bracket 29 is secured upon the top of the carriage by means of screws 30. This bracket is formed with a guiding recess 31 in which a clamping block 32 is loosely received and is vertically movable by means of a vertical adjusting screw 33 that turns in the bracket. The lower end of screw 33 has an annular groove 34 which loosely receives a pin 35 carried by block 31. The block 31 is thus capable of limited universal movement with respect to the bracket 29 and the carriage 12, in order that it may have uniform engagement with the work that is clamped between it and the jaws 27 when screw 33 is turned to apply said block to the work. The block 32 is formed with two clamping jaws 36 that overlie the jaws 27 and are respectively complemental thereto. The jaws 36 are desirably formed by providing an inverted V-shaped slot in block 32 of such depth and width as to permit the cutting wheel to pass therethrough without touching the block.

The opposed surfaces of the jaws 27 converge toward a line that lies in a plane which is substantially midway between the zones of the beveling faces of the cutting wheel 6, the opposed faces of the V-shaped groove in the block 32 desirably sloping similarly, though the invention is not to be thus limited. By thus sloping the opposing surfaces of the jaws 27, very short pieces of work may be clamped in the zone of the cutting wheel and the portions of the work immediately adjacent the cutting edges of the wheel are very firmly held with the result that the cutting is smooth. The jaws 27 are desirably formed by slotting a rectangular plate. This slotted plate is received in a groove 37 formed in the work table transversely of the carriage and through the bottom of which groove the cutting wheel projects upwardly, the wheel being in the middle of this groove. The top horizontal and work supporting sides of the jaws 27 are substantially flush with the top of the work table. When the work has been cut it is unclamped whereupon the work ejector 38 is operated against the force of its restoring spring 39.

Changes may be made without departing from the invention.

Having thus described my invention, I claim:

The combination with a work table having a groove in its top side; of a cutting wheel having symmetrically related beveling faces sloping from the crown thereof and projecting through the bottom of said groove; a work positioning carriage movable along said groove; a gauge stop upon said carriage; two clamping jaws upon the carriage and received in said groove, the tops of these jaws supporting the work and being substantially flush with the top of the work table, said jaws being spaced apart to receive the wheel therebetween, the opposed surfaces of these jaws converging toward a line that lies in a plane that is substantially midway between the zones of the beveling faces of said wheel; and two adjustable clamping jaws also upon the carriage and respectively complemental to the aforesaid jaws and disposed above the same.

In witness whereof, I hereunto subscribe my name.

WILLIAM J. KNOLL.